United States Patent [19]

Paspek, Jr. et al.

[11] Patent Number: 4,842,715
[45] Date of Patent: Jun. 27, 1989

[54] NOVEL TECHNIQUE FOR RENDERING OILY SLUDGES ENVIRONMENTALLY ACCEPTABLE

[75] Inventors: Stephen C. Paspek, Jr., North Royalton; Jeffrey B. Hauser, Middleburg Heights; Christopher P. Eppig, Cleveland Heights; Richard B. Stalzer, Broadview Heights, all of Ohio

[73] Assignee: The Standard Oil Company, Cleveland, Ohio

[21] Appl. No.: 132,221

[22] Filed: Dec. 14, 1987

[51] Int. Cl.$^4$ ............... C10G 17/00; C10G 21/00
[52] U.S. Cl. ............... 208/13; 208/177; 208/180; 208/181; 208/186; 208/187; 208/188; 208/309; 208/452; 208/424; 208/390; 208/314; 208/337; 585/240; 210/634; 210/638; 210/752; 210/758; 196/14.52
[58] Field of Search ......... 208/186, 309, 424, 13, 208/390, 952, 177, 180, 181, 187, 188, 314, 337; 585/240; 210/806, 634, 638, 752, 758; 196/14.52; 175/66

[56] References Cited

U.S. PATENT DOCUMENTS

| | | | |
|---|---|---|---|
| 1,836,849 | 12/1931 | Hough | 423/523 |
| 2,036,299 | 4/1936 | Robinson et al. | 208/13 |
| 2,069,472 | 2/1937 | Dufford | 23/172 |
| 2,134,909 | 11/1938 | Nooij et al. | 23/172 |
| 2,313,910 | 3/1943 | Archibald | 23/173 |
| 2,530,757 | 11/1950 | Bransky | 208/13 |
| 3,649,534 | 3/1972 | Schotte | 210/63 |
| 3,692,668 | 9/1972 | McCoy et al. | 208/13 |
| 3,696,021 | 10/1972 | Cole et al. | 208/13 |
| 3,849,536 | 11/1974 | Morgan | 423/206 |
| 3,977,966 | 9/1975 | Pradt et al. | 210/17 |
| 3,984,311 | 10/1972 | Diesen et al. | 210/63 |
| 4,224,136 | 9/1980 | Zukocker et al. | 208/8 LE |
| 4,264,453 | 4/1981 | Mraovich | 208/13 |
| 4,341,619 | 7/1982 | Poska | 208/390 |
| 4,347,144 | 8/1982 | Bodenbenner et al. | 210/761 |
| 4,434,028 | 2/1984 | Eppig et al. | 196/14.52 |
| 4,686,048 | 8/1987 | Alheron et al. | 208/13 |

FOREIGN PATENT DOCUMENTS 1375259 12/1972 United Kingdom .

Primary Examiner—H. M. S. Sneed
Assistant Examiner—Helane Myers
Attorney, Agent, or Firm—Michael F. Esposito; David J. Untener; Larry W. Evans

[57] ABSTRACT

A process is disclosed for separating an organic material from a composition comprising said organic material intermixed with particulate solids, the process comprising advancing a light hydrocarbon fluid through said particulate solids at an effective rate to drive at least some of said organic material from said particulate solids, adding water to said composition containing particulate solids and residual organic material to produce a second composition, and adding an oxidizing agent to said second composition in an amount sufficient to remove substantially all of the residual organic material.

15 Claims, No Drawings

NOVEL TECHNIQUE FOR RENDERING OILY SLUDGES ENVIRONMENTALLY ACCEPTABLE

CROSS REFERENCE TO RELATED APPLICATIONS

This application is related to Ser. No. 906,727, filed Sept. 12, 1986, and herein incorporated by reference.

BACKGROUND OF THE INVENTION

The present invention relates to a process for separating an organic material from a composition comprising the organic material intermixed with particulate solids. The invention is particularly suitable for separating organic material from particulate solid waste and particulate hazardous waste. It is also suitable for treating waste streams containing catalyst fines (e.g. decanter oil streams from fluid catalytic cracking units), oil contaminated drill cuttings, contaminated soil, steel mill scale, bleaching clay and the like.

Refinery sludges typically are mixtures of hydrocarbon oils, heavy residual hydrocarbons including asphaltenes, water and particulate solids. These sludges are produced from a number of refinery units, including various standard waste water treatment separators. The sludges often contain substances such as benzene, toluene, xylene, chrysene, etc. which are listed as hazardous materials by the Environmental Protection Agency (EPA). Typically, refinery sludges have in the past been disposed of by land filling and land farming techniques. However, because of environmental considerations, land disposal or land filling has recently become more difficult and much more expensive. Therefore, alternatives to conventional land filling and land farming techniques have been examined for hazardous waste removal. U.S. Pat. Nos. 4,341,619; 4,434,028 and the final report for EPA Contract No. 68-02-3924 are all concerned with various techniques for recovering carbonaceous or hydrocarbon materials from various hazardous waste streams.

U.S. Ser. No. 906,727 assigned to the assignee of the present application, discloses an alternative to these techniques for producing an environmentally suitable waste stream. The invention of the above-identified application provides for a process of separating an organic material from a composition comprising the organic material intermixed with particulate solids, comprising advancing a light hydrocarbon fluid through said particulate solids at an effective rate to drive the organic material from the particulate solids. In addition, the technique disclosed involves a multi-step procedure involving utilizing a light hydrocarbon material to initially extract the organic material from the particulate solids followed by using a higher molecular weight hydrocarbon to further capture the undesirable residual organic material from the particulate solids followed by a third step of extracting with a second light hydrocarbon material to further separate the residual higher molecular weight hydrocarbon fluids from the particulate solids. The present invention is directed to an improvement in the procedure disclosed in Ser. No. 906,727.

SUMMARY OF THE INVENTION

It is an object of the present invention to provide a novel procedure for the extraction of oil and residual hydrocarbons, in particular, polynuclear aromatics, from sludge generated in oil refineries.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects in accordance with the purpose of the present invention as embodied and broadly described herein, the process of the present invention comprises advancing a light hydrocarbon fluid through a mixture comprising particulate solids and organic material at an effective rate to separate at least some of the organic material from the particulate solids (this step reduces the total content of organic material but some organic material remains), and adding an oxidizing agent to the extractant containing particualte solids and residual organic materials to remove the residual organic materials. Optionally, the extractant can be slurried with water prior to adding the oxidizing agent. The oxidizing agent added to the slurry must be capable of oxidizing the residual organics from the sludge converting them to environmentally safe products such as $CO_2$, $N_2$ and $H_2O$.

The process of the present invention is a combination of the extraction procedure set forth in Ser. No. 906,727 with a wet oxidation procedure. The procedure of the present invention has been found to have a high efficiency in removing undesirable organics from the refinery sludge and the capability of converting these organics into environmentally acceptable materials (e.g., $CO_2$, $N_2$, $H_2O$, etc.).

DETAILED DESCRIPTION OF THE INVENTION

The compositions that can be treated in accordance with the present invention comprise an organic material intermixed with particulate solids. The organic material is typically in a liquid state at the pressure and temperature employed in the operation of the process, although part of the organic material may be in a solid state at such pressures and temperature. The compositions typically include water intermixed with an organic material and particulate solids. In particular, the compositions that can be treated by the process of the present invention include solid waste and/or hazardous waste including petroleum waste and refinery sludge. These terms in general refer to any garbage, sludge or other waste material generated in the waste streams of an oil refinery. For specific definitions of these terms, reference is made to co-pending application Ser. No. 906,727, filed Sept. 12, 1986, herein incorporated by reference.

In particular, the compositions that can be treated include oil contaminated catalyst fines (a refinery by-product), oil contaminated drill cuttings, oil contaminated mill scale, oil contaminated bleaching clay and the like. Most preferably the present invention is directed to treating compositions that are typically found in refinery sludges. A typical refinery sludge contains from about 1% to about 15% by weight hydrocarbon oil, from about 75% to 98% by weight water and from about 1% to about 15% by weight solids. Moreover, the process of the present invention may be utilized to treat high solid content sludge (i.e., solid content of 50% wt.

or greater). The invention will now be described in detail in terms of treating refinery sludge, but it is understood that the principles and features discussed herein are equally applicable with respect to the treatment of any composition comprising an organic material intermixed with a particular solid.

The light hydrocarbon fluid that is useful in the first step of the present invention is preferably selected from those materials set forth in Ser. No. 906,727. These fluids should be capable of selectively removing large fractions of hydrocarbon oil from the sludge to be treated while not removing significant amounts of any water that may be present in the sludge. The light hydrocarbon fluid should preferably have a sufficiently low viscosity so that at economical flow rates unmanageable pressure drops are not experienced. Preferred light hydrocarbon fluids include aliphatic and cycloaliphatic hydrocarbons having from about 2 to about 9 carbon atoms, preferably from 2 to about 4 carbon atoms. The selection of the particular fluid hydrocarbon must be made so that at least two phases are formed. Therefore, dependent on the particular form of the slurry some hydrocarbons extractants will work better than others. However, the selection of a suitable hydrocarbon clearly would be within the skill of one possessing ordinary skill in the art. Examples of these types of fluids include propane, cyclopropane, propylene, butane, isobutane and cyclobutane. For an extensive list of other suitable light hydrocarbons reference is made to Ser. No. 906,727, previously incorporated by reference.

In the practice of the present invention, the light hydrocarbon fluid is advanced or introduced into the sludge being treated at an effective rate to drive the hydrocarbon oil in the sludge from the particulate solids. This first step removes substantially all the hydrocarbon oil from the sludge. However, the remaining particulate solid after treatment with the light hydrocarbon fluid has been found to contain undesirable residual organic materials typically comprising hydrocarbons having low relative mutual solubilities. Typical of these hydrocarbons are polynuclear aromatic materials such as chrysene.

In accordance with the procedure set forth in Ser. No. 906,727, this extracted fluid can then be treated with a second higher molecular weight hydrocarbon to remove the remaining residual organic materials. However, this multi-step procedure may be eliminated by the practice of the present invention as set forth below.

In accordance with the present invention, the extracted fluid containing the particulate solids and the residual organic materials is treated with an oxidizing agent capable of oxidizing the residual organic materials to remove the organic materials, preferably converting them into gaseous components such as carbon dioxide and nitrogen. Depending on the relative water content of the extracted sludge, water may be added to aid the oxidation procedure. Accordingly, in another embodiment of the present invention the extracted material may be slurried with water to facilitate the oxidation step. Preferably, both steps are performed in the same vessel although transfer to a second vessel for the oxidation step is envisioned. The wet oxidation reaction preferably uses a strong oxidant such as nitric acid, dissolved nitrate salts such as ammonium nitrate and/or nitric oxide gases.

The second step of the process of the present invention may be performed either in a batch procedure, semi-batch procedure, sequential batch procedure or continuous flow reactor. The particular procedure utilized in the second step is dependent on the total amount of waste material required to be treated. For example, if only a small amount of waste material is produced, the batch procedure would likely be more economical. The greater the amount of waste, the more likely that the economics of the batch procedure would be replaced by either the semi-batch or continuous procedures. However, no matter which procedure is utilized, it is required that the oxidizing agent should be added in an amount sufficient to remove substantially all of the residual organic materials remaining in the sludge. Typically, at least a stoichiometric amount of oxidant should be added, preferably an amount in excess to the stoichiometric amount should be utilized to ensure good results. Air, oxygen, nitrates or $HNO_3$ are suitable as typical oxidants for the second step. The preferred oxidant is $HNO_3$.

In the batch procedure, all the extracted sludge, slurry water and particulate solid are loaded into a pressure vessel at approximately 1 atmosphere. The oxidant is then loaded into the pressure vessel. The vessel is then closed and the mixture is heated between a temperature of between 150° C. to 500° C., preferably 175°–400° C., most preferably between 200° C. to 375° C. The reaction (oxidation of the organics) is allowed to proceed to completion. After sufficient reaction time, the system is cooled and the product ($CO_2$) is vented. The now cleaned solids are slurried out of the reactor to a dewatering unit or holding pond. The batch mode reaction requires that all the carbon dioxide or other gases generated be contained in the reaction vessel. It is important to ensure that premature venting of the gas phase does not take place prior to reaction completions because this could cause release of significant quantities of nitrogen oxides which affect air quality.

Typically, the semi-batch procedure comprises placing all the particulate solids and slurry water into a small reaction vessel. The vessel is sealed and heated to reaction temperature. A portion of the total amount of oxidant (i.e., less than stoichiometric amount) to be added is then introduced and allowed to react almost to completion. The product gases generated increase the system pressure. However, since only a portion of the oxidant was added, only a small amount of $CO_2$ is generated and the pressure increse is modest. Since the oxidation reaction has been allowed to proceed to near completion, there is essentially no nitrogen oxides in the gas phase. The gas phase is then vented and another portion of the oxidant is added. This cycle continues until at least a stoichiometric amount of the oxidant (e.g. nitrate) has been added to the system. The portion of oxidant added in each individual step does not necessarily have to be the same although this is preferred. It is required that any single portion should not be so large so as to create any significant build up in pressure thereby necessitating the need for high pressure apparatus. This amount can be readily calculated by anyone having ordinary skill in the art. After cooling, the system is vented and unloaded as in the batch procedure. The attendant advantages of the semi-batch operation are that one only has to handle the waste solids one time and the reactor does not have to be capable of withstanding high pressures because the oxidant is added in small portions.

A preferred embodiment of the semi-batch procedure involves a scheme wherein two or more types of oxidizing agents are introduced sequentially to minimize the oxidation costs. The first oxidant may be an oxygen-containing gas such as air, enriched air or oxygen. This first oxidant is capable of removing the so called "easy" organic residual contaminants (i.e., relatively easy to oxidize). The product gas of the first oxidation step is then vented off. A stronger oxidant such as nitric acid and/or a nitrate (e.g., $NH_4NO_3$) is now added either stoichiometrically or in a series of small portions to complete the decontamination. Most preferably, the source for the nitrate oxidant is a waste stream from some chemical plant. This would lead to a significant economical saving. In a further preferred embodiment of the present invention $H_2SO_4$ acid is added to either the $HNO_3$ or waste nitrate of mixtures thereof. It has been found that particularly good results have been obtained when $H_2SO_4$ is added as a catalyst. The amount of $H_2SO_4$ added should be sufficient to catalyze the reaction and can be readily determined by one having ordinary skill in the art.

The process of the present invention also encompasses a continuous flow procedure. This procedure would involve designing the reactor for plug flow behavior, continuous stir tank behavior or something intermediate. In a plug flow system the oxidants can be added sequentially down the length of the reactor allowing for the benefits of the oxidation as a continuous procedure.

In a further preferred embodiment of the semi-batch or continuous procedure a condenser is placed downstream of the reaction vessel. Accordingly, as the gases are vented any water vapor is condensed at the high pressure and allowed to fall back in the vessel. The condensed water will scrub any $(NO)_x$ from the vent gas and recycle it to the vessel where it can be used as an oxidant.

It is envisioned that the semi-batch procedure or continuous procedure will be the most economical from the point of handling the solids one time and limiting the requirements for the reactor size and pressure handling capabilities. As stated above, the semi-batch procedure which involves introduciton of a small portion of the oxidant at one time allows the reaction to proceed to completion at a relatively low pressure which alleviates any concern regarding high pressure.

For purposes of illustration the following examples are set forth below as illustrative of the practice of the present invention.

EXAMPLE 1

Chrysene was used as a model of the residual organic material found in the refinery sludge after propane (i.e., light hydrocarbon) extraction. About 0.25 g of chrysene was loaded into a 12 cc reactor with 1.5 g of nitric acid, 1.0 g of water and 0.1 g of sulfuric acid. The reactor was sealed and immersed in a 300° C. sand bath. Inspection of the reactor contents after 30 mins. indicated that more than 90% of the chrysene had been converted to other species. Material balance measurements indicated that $CO_2$ was the likely product. The liquid phase was light yellow in color and a small amount of white material remained. Inspection of the reactor contents after 8 hours indicated 100% conversion of the chrysene. The liquid phase was clear and no solids were observed.

EXAMPLE 2

Two grams of refinery sludge were loaded into a 12 cc batch reactor with 1.0 g of water, 1.7 g of 70 wt. % nitric acid solution and 0.1 g sulfuric acid. The reactor was sealed and heated to 250° C. for 30 mins. The products included a gas phase rich in $CO_2$, a clear liquid phase and a red sand like solid. Volatile suspended solids (VSS) measurements indicated a reduction in VSS of more than 96%.

EXAMPLE 3

1.98 g of refinery sludge previously extracted with a $C_3$ light hydrocarbon (i.e. propane) was loaded into a reactor with 0.98 g $H_2O$ and 1.71 g of $HNO_3$. The reactor was sealed and heated to 250° C. for 30 minutes. The Total Organic Carbon Solids (TOC) removed was 97.3%.

EXAMPLE 4

The procedure of Example 3 was followed except that 2 g of sludge and 1 g of $H_2O$ were utilized. The reaction proceeded for 1 hour. The TOC removed was 97.6%

EXAMPLE 5

The procedure of Example 3 was followed except that 1.99 g of sludge, 0.99 g of $H_2O$ and 1.7 g of $HNO_3$ were utilized and the reaction time was 4 hours. The TOC removed was 99%.

EXAMPLE 6

The procedure of Example 4 was followed except that 0.5 g of $HNO_3$ was added and the reaction time was 30 minutes. The TOC removed was 50%.

EXAMPLE 7

The procedure of Example 4 was followed except that the reaction time has 30 minutes. The TOC removed was 82.5%.

EXAMPLE 8

The procedure of Example 7 was followed except that 1.5 g of $HNO_3$ was added. TOC removed was 96.3%.

The above examples clearly illustrate the effectiveness of the process of the present invention which is directed to a safe economic procedure for removal of substantially all hazardous contaminants from an oily sludge waste stream.

While the invention has been described in conjunction with the specific embodiments thereof, it is evident that many alternatives, modifications and variations will be apparent to those skilled in the art in light of the foregoing description. Accordingly, it is intended to embrace all such alternatives and modifications and variations as fall within the spirit and broad scope of the appended claims.

What is claimed is:

1. A process of treating a waste stream produced in an oil refinery said waste stream containing organic material intermixed with particulate solids comprising (1) contacting a light hydrocarbon fluid with said waste stream ot extract at least some of said organic materials from said waste stream and (2) adding an oxidizing agent to said treated waste stream in an amount sufficient to remove substantially all of the residual organic material.

2. The process of claim 1 wherein said oxidizing agent is selected from the group consisting of oxygen and nitric acid.

3. The process of claim 1 wherein said oxidizing agent is a nitrate.

4. The process of claim 3 wherein said nitrate is selected from a waste stream.

5. The process of claim 1 wherein waste stream comprises refinery sludge.

6. The process of claim 1 wherein at least a stoichiometric amount of oxidizing agent is added to said treated waste stream to ensure removal of substantially all of the residual organic material.

7. The process of claim 6 wherein said oxidizing agent is added to said treated waste stream in at least two steps.

8. The process of claim 7 wherein the oxidizing agent added in at least one of said steps is different than the oxidizing agent used in at least one of the remaining steps.

9. The process of claim 8 wherein said first oxidizing agent is selected from the group consisting of oxygen and air.

10. The process of claim 8 wherein the oxidizing agent used in the second step is a nitrate supplied from a waste nitrate stream.

11. The process of claim 9 wherein said second oxidizing agent is nitric acid.

12. The process of claim 10 wherein said second oxidizing agent is nitric acid.

13. The process of claim 1 further comprising adding $H_2SO_4$ to said treated waste stream along with said oxidizing agent.

14. The process of claim 11 wherein prior to adding said oxidizing agent to said waste stream and subsequent to contacting said waste stream with said light hydrocarbon fluid, said waste stream is contacted with a second higher molecular weight hydrocarbon fluid to drive at least some of the residual organic materials from said waste stream.

15. The process of claim 1 wherein water is added to said treated waste stream prior to adding said oxidizing agent.

* * * * *